M. DE GRAFF.
Street Car.
No. 94,086. Patented Aug. 24, 1869.
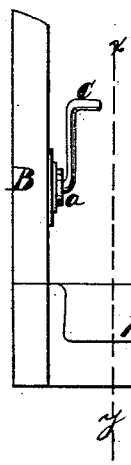
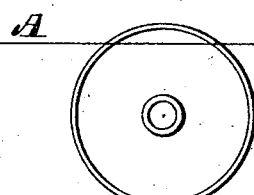
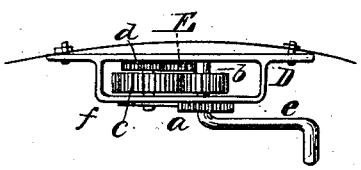
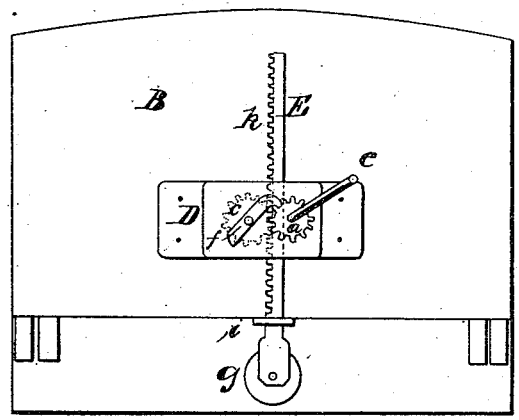
Witnesses:
E. A. West
L. L. Bond
Inventor:
Marinus De Graff

United States Patent Office.

MARINUS DE GRAFF, OF CHICAGO, ILLINOIS.

Letters Patent No. 94,086, dated August 24, 1869.

IMPROVEMENT IN STREET-CARS.

The Schedule referred to in these Letters Patent and making part of the same

*To all whom it may concern:*

Be it known that I, MARINUS DE GRAFF, of the city of Chicago, in the State of Illinois, have invented certain new and useful Improvements in Street-Cars; and I do hereby declare that the following is a full, clear, and exact description thereof, reference being had to the accompanying drawings, making part of this specification, in which—

Figure 1 is a side view of a portion of a car.

Figure 2, a detail and top view, showing my device for moving the car.

Figure 3, a transverse section on line $x\ y$.

Cars frequently run off the track, and are replaced, with much difficulty and delay, by the united efforts of employés and passengers.

The object of my invention is to provide a convenient means of replacing cars upon the track.

To enable others skilled in the art to make and use my invention, I proceed to describe the construction and operation of the same.

A represents the bottom of a car, all that part of the body of the car above the bottom being removed.

$h$ is the step by which to reach the platform.

B is the dash-board at one end, the other end not being shown.

Upon the inside of the dash-board B, I secure firmly, by means of bolts or otherwise, the frame D.

E represents an iron bar, having cogs $k$ on one side, to the lower end of which is secured and supported, in any suitable manner, a wheel, $g$.

$a$ and $b$ are cog-wheels, secured to the crank-axle $e$, as shown, while $c\ d$ are two other cog-wheels, fastened upon an axle, as shown.

These several parts are located and arranged, as shown, the wheels $b$ and $c$ engaging with each other, and the wheel $d$ engaging with the cogs upon the bar E.

These parts are the operating-parts of this device, and are operated through the crank $e$.

The cog-wheel $a$ is used only as a ratchet-wheel, $f$ being the ratchet. This wheel and ratchet serve the purpose of holding the other parts of the device in any desired position.

As shown in fig. 3, the bar E is raised, this being its ordinary position.

The operation of this device is as follows:

If the car runs off from the track, it can be easily replaced, by turning the crank $e$ in the proper direction, to bring the wheel $g$ down upon the ground, and when continuing the operation until the end of the car is raised sufficiently to permit the wheels F to pass over the rail; and, when in this position, the end of the car, which is supported by $g$, can be easily pushed over to its proper place over the track, or may be drawn over by the horses, when, by reversing the motion of the crank, the car can be let down to its place upon the rails.

It will be observed, that when the car is in the proper position to be moved over to its place, it is supported upon one pair of the car-wheels and the wheel $g$, the other pair of wheels F being raised from the ground; and when in this position, the end of the car, supported on the wheel $g$, can be easily moved either to the right or left, as may be necessary.

I place one of these devices upon each end of the car, so that if all the wheels of the car get off from the track, one end can be first brought to place, and then the other.

Double tracks are frequently provided for street-cars, and it oftentimes becomes necessary, in consequence of temporary obstructions in the street, to change the cars, at each trip, from one track to the other. The devices now used for this purpose require the constant attendance of several men. The same object can be easily accomplished, by my device, by the driver and conductor only, moving each end of the car alternately, as before described.

I do not describe particularly the mode of attaching this device to the car. It will probably be necessary to secure additional supporting-irons to the dash-boards.

The wheel $g$ may be made of any suitable size. I think it advisable to make it somewhat larger than shown.

The bar E, being between the axle $e$ and the wheel $d$, cannot get out of place.

An additional stirrup or guide may be upon the bottom of the car, as seen at $i$, fig. 3.

I use the three wheels $b\ c\ d$ for the purpose of multiplying the power, but do not confine myself to the arrangement shown.

Cogs may be placed on both sides of the bar E, in which case other wheels would be used for operating the bar.

I do not claim as my invention the rack-shaft E and wheel $g$; but

What I claim as new, and desire to secure by Letters Patent, is—

The combination of the rack-shaft E and wheel $g$ with the pinion $d$, spur-wheels $c$ and $b$, ratchet-wheel $a$, and double-acting pawl $f$, substantially as and for the purposes specified.

MARINUS DE GRAFF.

Witnesses:
E. A. WEST,
L. L. BOND.